April 7, 1942.　　C. L. HUNSICKER　　2,278,854
DRYING APPARATUS
Filed Oct. 30, 1939
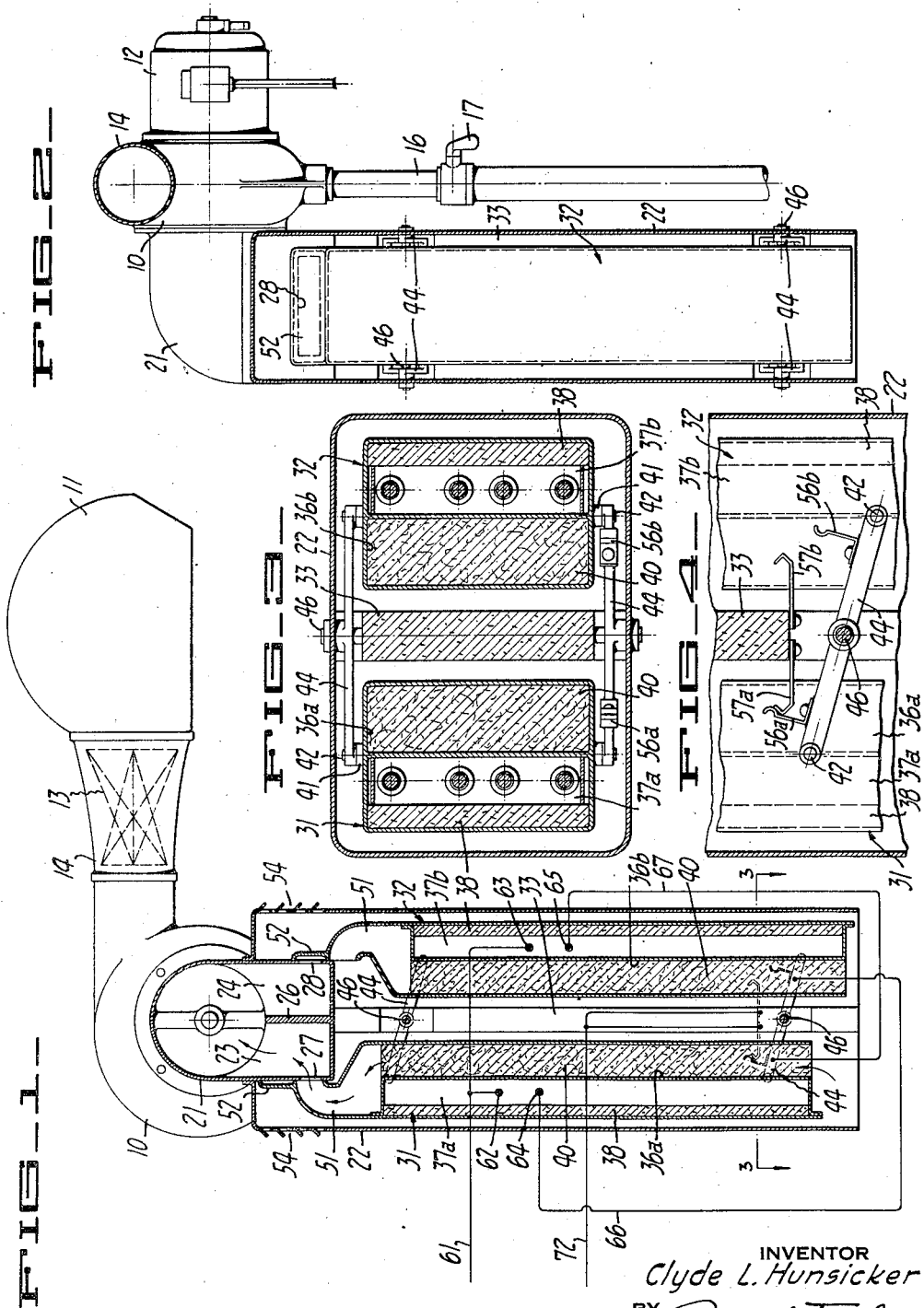
INVENTOR
Clyde L. Hunsicker
BY Paul D. Flehr
ATTORNEY Patented Apr. 7, 1942

2,278,854

UNITED STATES PATENT OFFICE 2,278,854

DRYING APPARATUS

Clyde L. Hunsicker, San Francisco, Calif.

Application October 30, 1939, Serial No. 301,989

5 Claims. (Cl. 183—4)

This invention is concerned generally with apparatus for drying operation with air currents or the like, and more particularly it relates to apparatus for drying the human hair.

It is a general object of the invention to provide drying apparatus including moisture absorbing means which is automatically recycled during operation of the apparatus.

Another object of the invention is to provide drying apparatus including automatic recycling means wherein the recycling is controlled by the condition of the moisture absorbing means itself.

Other objects and advantages will appear from the following description of a preferred embodiment of the invention which has been described in detail in connection with the accompanying drawing in which:

Fig. 1 is a side elevational view partially in section showing hair drying apparatus incorporating the instant invention.

Fig. 2 is an elevational view partly in section taken at right angles to the view shown in Fig. 1.

Fig. 3 is a horizontal sectional view taken in a plane indicated by the lines 3—3 in Fig. 1.

Fig. 4 is a fragmentary sectional view partially in elevation of a part of a circuit control means.

The instant invention is illustrated as embodied in hair drying apparatus wherein the hair of the subject is dried by air delivered from a blower or fan and the drying is accelerated by absorbing the moisture from the air to increase its drying capacity. It will be understood, of course, that the invention can be employed in other types of drying or conditioning equipment where continuous operation with automatic recycling of the units is desired.

Referring to Figs. 1 and 2, the apparatus includes a conventional form of blower 10 connected to an air distributor 11 which may be helmet shaped to generally surround the head of the subject and direct the air upon the head. The blower is driven by motor 12. The air is heated by suitable means such as an electrical heating element 13 carried within the conduit 14 which connects the blower 10 with the distributor 11. As seen in Fig. 2 the blower 10 is supported upon a telescopic standard 16 having a clamping screw 17 associated therewith. In turn, the blower 10 may support the remainder of the apparatus as shown.

The air for intake by the blower 10 is dried by moisture absorbing units which are automatically alternated in operation to provide continuous operation with increased drying capacity of the apparatus. As shown in Figs. 1 and 2 the intake of the blower 10 is connected to a conduit 21 suitably secured at the upper end of a depending casing 22 which is open at its lower end. As seen in Fig. 1, the lower portion of conduit 21 is divided into two compartments 23 and 24 by central partition 26. Compartments 23 and 24 have respective horizontally elongated intake ports 27 and 28 in the outer side walls thereof. Conduit 21 is closed except for the ports 27 and 28 and its opening into the blower.

A pair of moisture absorbing units 31 and 32 are provided within the casing 22 at either side of a central vertical partition 33 mounted between the side walls of casing 22 and also suitably connected to the bottom wall of the conduit 21.

The moisture absorbing units 31 and 32 may be formed substantially in accordance with the disclosure of my co-pending application, Serial No. 231,884, filed September 27, 1938. Briefly the units consist of elongated conduits 36a, 36b alongside of which there are suitably enclosed electrical heating elements 37a, 37b. Suitable heat insulating material such as asbestos packing 38 may be provided adjacent heating elements 37a, 37b, opposite to the conduits 36a and 36b. The interior of each conduit 36 is filled with a porous medium 40 capable of absorbing moisture from the atmosphere. As disclosed in said co-pending application, the porous medium may consist of fragments of asbestos saturated with calcium chloride, and interspersed in glass wool or a like medium. I may also use the type of unit disclosed in my later filed application, Serial No. 287,546, filed July 31, 1939.

Each of the moisture absorbing units 31 and 32 is mounted for substantially vertical movement between respective moisture absorbing and recycling positions. As shown in Figs. 1, 2 and 3 unit 31 is provided with a pair of vertically spaced bosses 41 carrying respective pivot pins 42 which engage in the adjacent apertured ends of a pair of levers 44 pivoted on respective vertically spaced shafts 46 extending through the partition 33 and having their ends mounted in the walls of casing 22. Unit 32 is similarly connected to the opposite ends of the levers 44. Two sets of levers 44 are provided at either side of the partition 33 forming with the respective units 31 and 32 a parallel linkage whereby the units are mounted in counterbalanced relation for vertical movement between their respective operating and recycling positions.

As shown in Fig. 1, unit 31 is in its uppermost or operating position where the discharge passage 51 from conduit 36 is in communication with intake port 27 for compartment 23 of the blower intake conduit, so that air is drawn from the outside through the packing 40 in the conduit 36a and then through the outlet passage 51 to the intake of the blower and thence to air distributor 11.

Unit 32 is in its lowermost or recycling position in Fig. 1 and the associated intake port 28 is closed by valve extension 52 of the unit. Also discharge passage 51 of unit 32 opens into the interior of casing 22 and the air and vapor therefrom can be vented out through the vent openings 54 in the side walls of the casing.

Yieldable latch or detent means are provided for holding the units in the selected adjusted positions thereof. As best seen in Fig. 4, one of levers 44 carries a pair of spring detent members 56a, 56b for cooperation with complemental detent members 57a, 57b mounted on partition 33. These detent members may also form a part of the circuit connections.

Circuit means are provided whereby when a moisture absorbing unit is in its lowermost position the heating unit associated therewith is energized to regenerate the unit by driving the moisture from the moisture absorbing medium. As seen in Fig. 1 one side of the line 61 is connected to respective terminals 62 and 63 of the respective heating elements 37a and 37b. The other terminals 64 and 65 of the heating elements are connected by respective leads 66 and 67 to respective detent members 56b and 56a which are electrically insulated from lever 44. As shown in Fig. 4 detent contact 56a and 56b are adapted for selective association with respective detent contacts 57a and 57b which are connected by lead 72 to the opposite side of the line.

Thus when moisture unit 31 is in its operative raised position as shown in Fig. 1 where the air drawn thereto is delivered to the blower, detent contacts 56a and 57a are engaged to close the circuit for heating element 37b for moisture absorbing unit 32 so that this unit is regenerated while unit 31 is operative in drying the air being drawn therethrough by blower 10. Conversely, if unit 32 is raised to its operative drying position, unit 31 is in its lowermost regenerating position.

The movement of units 31 and 32 between their operative drying positions and their regenerating positions is controlled automatically by relative weights thereof. As constructed the units 31 and 32 are counterbalanced so that the heaviest unit will fall by gravity to its lower regenerating position. Therefore, when one unit absorbs moisture to substantially its capacity, it becomes heavy enough to cause yielding of the associated detent when the heavier will fall and lift the lighter unit to its drying position where it is held by the associated detent members.

In operation, assuming the apparatus to be conditioned as shown in Fig. 1, for example, wherein air is being drawn through the unit 31 whose heating element 37a is disabled and discharged from the blower. In this position, heating element 37b for unit 32 is enabled so that the moisture absorbing medium 40 in the conduit 36b is heated. The moisture driven out from unit 32 may be discharged through the lower end of the conduit or from its upper end into the casing 22 and thence out through vent openings 54.

When the operation has proceeded until the weight of the unit 31 which is absorbing the moisture becomes sufficiently greater than the weight of the unit 32, the detent contacts 56a, 57a will be disengaged to release unit 31 and at the same time to break the circuit for the heating unit 37b. As unit 31 falls, unit 32 will be raised to operative position where it is held by detent contacts 56b, 57b which also make the circuit for heating element 37a so that moisture absorbing unit 31 is regenerated while the moisture from the air being used is absorbed by the unit 32. This alternate use of the two moisture absorbing units will be automatically repeated as the apparatus is used without any attention from the operator so that substantially continuous drying operation is enabled.

I claim:

1. In drying apparatus, at least two moisture absorbing units, each unit comprising a conduit for passage of air and moisture absorbing material within the conduit adapted to be dried by application of heat, heating elements associated with each of said units, means mounting said units for movement to their respective air conducting positions, said mounting means connecting said units for simultaneous movement in opposite directions, means for causing a flow of air through the apparatus, selectively operable valve means for controlling the flow of air through said units, and control means for said heating elements controlled simultaneously with said valve means to enable a heating element of one unit when the valve means therefor is in closed position, said valve means and said heating element control means being controlled by said units upon movement thereof to and from the air conducting positions thereof.

2. In drying apparatus having a means for discharging air for drying purposes, a pair of moisture absorbing units for selective alternate association with said discharging means, each unit comprising a conduit for passage of air and moisture absorbing material within the conduit, means for causing a flow of air through the apparatus to said discharging means, and means mounting said units in counterbalanced relation, whereby the higher of said units is in operative relation with said discharging means and the lower of said units is out of operative relation with said discharge means, the relative positions of said units being controlled by the relative weights of said units, said apparatus also including regenerating means active with respect to each of said units when in its lowered position.

3. In drying apparatus, a vertically disposed casing having an outlet, means for causing a flow of air from said outlet, a pair of moisture absorbing units mounted for alternate movement between air drying and regenerating positions, said units providing respective air conduits containing moisture absorbing material, valve means for connecting each of said units in the air drying position thereof to said outlet, regenerating means for said units, said units being in counterbalanced relation to move between said air drying and regenerating positions in response to the relative weight of the respective units, and means for yieldably retaining said units in either adjusted position thereof, said retaining means being responsive to increased weight of the unit in air drying position to substantially saturated condition to cause said unit to move downwardly to regenerating position and to lift the other unit from its regenerating position to its air drying position.

4. In drying apparatus for air, a casing having a discharge compartment with an outlet and a pair of intake ports in opposite side walls thereof, means for causing a flow of air from said outlet, lever means pivoted in said casing, a pair of moisture absorbing units mounted at the opposite ends of said lever means in counterbalanced relation, each unit having a passage therethrough and moisture absorbing material in said passage, the inlet end of each unit being open and the discharge end of each of said units having an opening for alignment with the associated one of said ports and valve means for closing said associated port, whereby said units may be selectively placed in air drying position, and means for regenerating each of said units when in inactive position with said valve means closing the associated port.

5. In drying apparatus, a discharge chamber having a pair of openings leading thereto, means for causing a flow of air from said discharge chamber, a pair of moisture absorbing units for selective alternate association with said discharge conduit, each unit comprising a conduit for passage of air and moisture absorbing material within the conduit, each unit having an intake opening and also having a discharge opening for communication with an opening of said discharge chamber in one position of said unit and a cover for closing said opening in the other of said positions, means for regenerating each of said units when out of communication with said discharge chamber, and means mounting said units in counter balanced relation whereby said units move in response to the relative respective weights thereof, whereby the higher of said units has its discharge opening in communication with the associated opening of said discharge chamber and whereby the cover of the lower of said units closes the associated opening of said discharge chamber.

CLYDE L. HUNSICKER.